Nov. 25, 1958 D. RICHMAN 2,862,050

BALANCED PHASE-DETECTION SYSTEM

Filed March 23, 1955 2 Sheets-Sheet 1

United States Patent Office 2,862,050

Patented Nov. 25, 1958

2,862,050

BALANCED PHASE-DETECTION SYSTEM

Donald Richman, Fresh Meadows, N. Y., assignor to Hazeltine Research, Inc., Chicago, Ill., a corporation of Illinois Application March 23, 1955, Serial No. 496,141

8 Claims. (Cl. 178—5.4)

*General*

This invention relates to balanced phase-detection systems and, more particularly, to such systems for utilizing the phase of a reference signal which recurrently occurs for short periods to control the phase of another signal. Though the invention is not limited thereto, such reference signal may be the color burst signal employed in an NTSC type of color-television system for controlling the phase of a signal developed in an oscillator of a color-television receiver and the invention will be described in such environment.

In an NTSC type of color-television receiver, a locally generated signal, having different phases as applied to different synchronous detectors, is heterodyned in such detectors with a received subcarrier wave signal modulated at specific phases by different color-signal components to derive such components therefrom. In order that such color-signal components be faithfully derived, the phases of the locally generated signal, as applied to the different synchronous detectors, are controlled by means of a received color-synchronizing or burst signal. This phase control may be effected by means of conventional automatic-phase-control circuits or more elaborate circuits having a higher degree of control and stability such as described in an article entitled "The D. C. Quadricorrelator: A two-mode synchronization system" at pages 288–299, inclusive, of the January, 1954 Proceedings of the I. R. E. In either of the above types of detectors, the phase-detector tubes are rendered conductive during the period of occurrence of the burst by amplifying such burst so that the peak intensity thereof is sufficiently high to exceed the cutoff potentials on the detector tubes. In addition, a gating circuit is employed prior to the phase detectors for translating the color burst signal for application thereto and for rejecting any other signals occurring between bursts. This type of operation is wasteful of equipment in that it requires a signal-gating stage and greater amplification for the burst signal than would be needed for purely phase-detection purposes. In addition, it is wasteful of information. In view of the large amplitude of the amplified burst and the inherent lack of sensitivity of a balanced detector system to the signal employed for rendering the detector conductive, the information in the variation of the peak amplitude of such burst is not available, except by means of an unbalanced peak detection thereof, for automatic gain control of the channel for translating the burst and chrominance signals. It is desirable to minimize the amount of amplification required for the received burst signal to combine the gating and phase-detection operations and also desirable to utilize the amplitude variation of the burst signal for developing a control signal in the output circuit of a balanced synchronous detector which is available for gain control of the channel through which the chroma and burst signals are translated.

It is, therefore, an object of the present invention to provide a new and improved balanced phase-detection system which avoids one or more of the above disadvantages and limitations of prior phase-detection systems.

It is a further object of the present invention to provide a new and improved balanced phase-detection system for the color-signal deriving circuits of an NTSC type of color-television receiver in which variations in the amplitude of the color burst signal are employed to develop an automatic-gain-control signal.

It is still another object of the present invention to provide a new and improved balanced phase-detection system for use in the color-signal deriving circuits of an NTSC type of color-television receiver in which the color burst signal is of relatively low intensity.

It is a still further object of the present invention to provide a balanced phase-detection system in which a gating signal is employed to render the system conductive at periodic intervals.

It is an additional object of the present invention to provide a new and improved balanced phase-detection system of simple and inexpensive construction.

In accordance with a particular form of the present invention, a control system for an NTSC type of color-television receiver comprises a chrominance channel including a source of reference oscillations. The control system also comprises means for supplying recurrent color burst signals for synchronizing the oscillations. The system further comprises phase-detection apparatus responsive to the burst signals and the oscillations and including three unidirectional conductive devices and circuit means intercoupling the devices for applying the burst signals and oscillations to the circuit means and devices at such magnitudes and phases as to produce at one point in the circuit means a first control voltage for synchronizing the oscillations and at another point a second control voltage which is an indication of the amplitude of the burst signals when the oscillations are in-synchronism but which is substantially zero when the oscillations are out-of-synchronism. The system further comprises means for utilizing the first control voltage to synchronize the oscillations. The control system finally comprises means for utilizing the second control voltage to disable the chrominance channel when the oscillations are out-of-synchronism.

For a better understanding of the present invention, together with other and further objects thereof, reference is had to the following description taken in connection with the accompanying drawings, and its scope will be pointed out in the appended claims.

Referring to the drawings.

Figure 2:
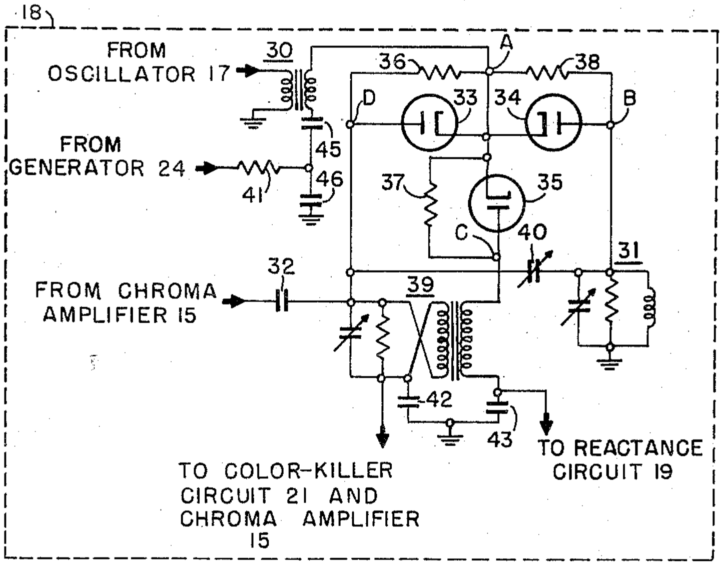
Fig. 2 is a detailed circuit diagram of one embodiment of such phase-detection system.
Figure 2A:
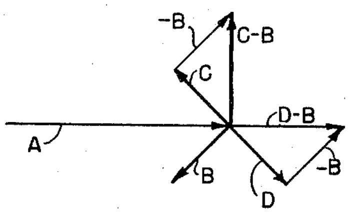
Figure 3A:
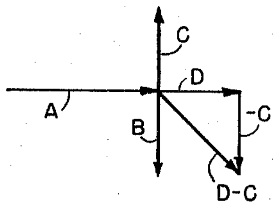
Figure 3:
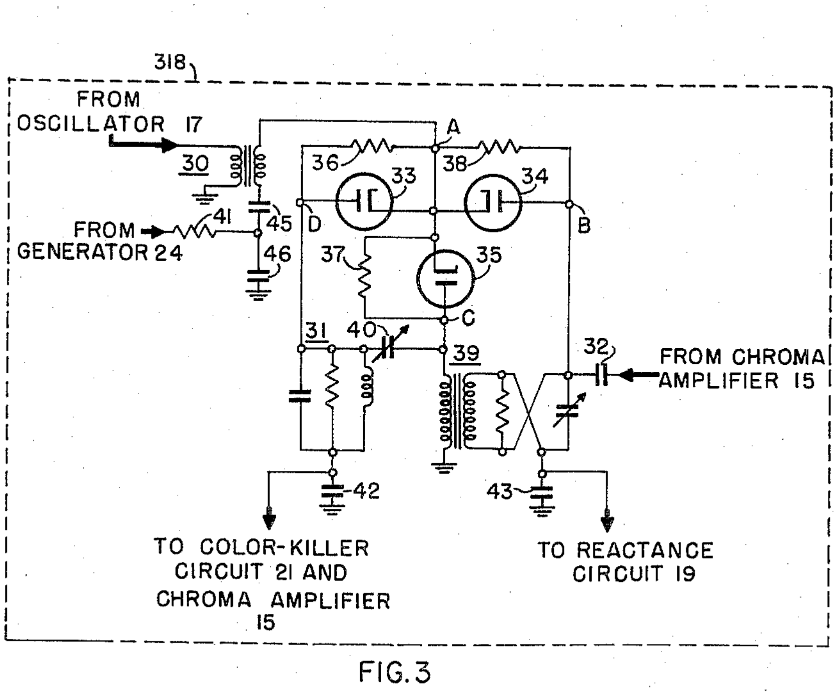

Fig. 2*a* is a vector diagram useful in explaining the operation of the embodiment of Fig. 2;

Fig. 3 is a detailed circuit diagram of another embodiment of such phase-detection system, and Fig. 3*a* is a vector diagram uesful in explaining the operation of the embodiment of Fig. 3.

Figure 1:
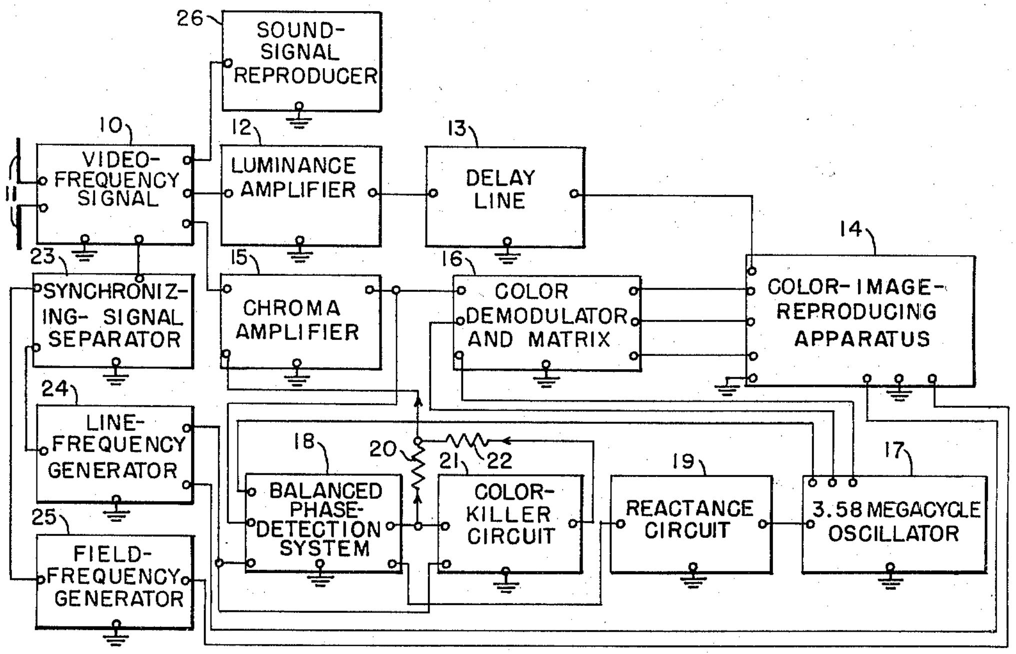
Fig. 1 is a schematic diagram of a color-television receiver including a balanced phase-detection system constructed in accordance with the invention.

*General description of color-television receiver of Fig. 1*

Referring now to Fig. 1 of the drawings, there is represented a color-television receiver suitable for utilizing an NTSC type of color-television signal. The receiver includes a video-frequency signal source 10 which may be conventional equipment for supplying an NTSC type of composite video-frequency signal. For example, it may comprise a radio-frequency amplifier having an input circuit coupled to an antenna 11, an oscillator-modulator, an intermediate-frequency amplifier, and a detection system for deriving the video-frequency signal. An output circuit of the video-frequency signal source 10 is coupled through a luminance channel including, in cascade, in the order named, a luminance amplifier 12 and a delay line 13, to an input circuit of a color-image-reproducing apparatus 14. The amplifier 12 may be a conventional wide band amplifier, for example, having a pass band of approximately 0–4.2 megacycles and the delay line 13 may be a conventional line proportioned to equalize the time of translation of the luminance signal through the amplifier 12 and the line 13 with that for translation of the chrominance signal through a chrominance channel to be discussed hereinafter. The color-image-reproducing apparatus 14 may be of conventional construction, for example, may comprise a three-gun cathode-ray tube of the so-called shadow-mask type having phosphors for developing three primary colors and now employed in many color-television receivers.

An output circuit of the video-frequency signal source 10 is also coupled through a chrominance channel to input circuits of the color-image-reproducing apparatus 14. Such chrominance channel may include, in cascade in the order named, a chroma amplifier 15 and a demodulator and matrix circuit 16 having three output circuits individually coupled to three input circuits of the image-reproducing apparatus 14. A pair of input circuits of the unit 16 is coupled to a pair of output circuits of a 3.58 megacycle oscillator 17 comprising a source of reference oscillations. The chroma amplifier 15 may be of conventional construction for translating a component of the video-frequency signal, for example, that portion of the video-frequency signal including the subcarrier wave signal modulated at specific phases by color-signal components. Such subcarrier wave signal has a mean frequency of approximately 3.58 megacycles and the side bands thereof usually extend from 2.0 to 4.2 megacycles. Therefore, the amplifier 15 may have a pass band of the order of 2.0–4.2 megacycles. The color demodulator and matrix circuit 16 may also be of conventional construction including a plurality of synchronous detectors and a signal-matrixing system for developing, for example, colors representative of the green, red, and blue components of a televised image for application to the image-reproducing apparatus 14.

The output circuit of the chroma amplifier 15 is also coupled to a balanced phase-detection system 18 constructed in accordance with the present invention and to be described more fully hereinafter. The detector 18 has another input circuit coupled to an output circuit of the oscillator 17. One output circuit of the unit 18 is coupled through a reactance circuit 19 to the 3.58 megacycle oscillator 17 and another output circuit is coupled through a resistor 20 to a gain-control circuit of the chroma amplifier 15 and also coupled through a color-killer circuit 21 and an isolating resistor 22 to the same gain-control circuit of the amplifier 15. The color-killer circuit 21 may be of conventional construction, for example, such as described in the aforementioned January, 1954 I. R. E. article for developing a large negative bias potential when the oscillator 17 is not synchronized and substantially zero potential when it is synchronized.

Another output circuit of the video-frequency signal source 10 is coupled through a synchronizing-signal separator 23 to input circuits of a line-frequency generator 24 and a field-frequency generator 25, the output circuits of the latter units being coupled to horizontal and vertical deflection windings in the color-image-reproducing apparatus 14. Additionally, an output circuit of the generator 24, for example a terminal on the horizontal deflection transformer therein, is coupled to input circuits of the balanced phase-detection system 18 and of the color-killer circuit 21.

A fourth output circuit of the video-frequency signal source 10 is coupled to a sound-signal reproducer 26 which may comprise a conventional intermediate-frequency amplifier, an audio-frequency amplifier, and a sound reproducer such as a loudspeaker.

Except for the balanced phase-detection system 18, all of the circuit components described above and their combinations are conventional and well known. Therefore, no detailed description of such circuit components is provided herein.

*General operation of color-television receiver of Fig. 1*

Considering briefly now the operation of the receiver of Fig. 1 as a whole and assuming for the present that the balanced phase-detection system 18 is conventional, a desired composite color-television signal of the NTSC type is intercepted by the antenna system 11, selected, amplified, converted to an intermediate-frequency signal, further amplified, and the composite video-frequency signal component thereof detected in the unit 10. Such composite video-frequency signal comprises conventional line- and field-synchronizing components, a color burst synchronizing component, and luminance and chrominance signals. The luminance signal, being substantially the same as a conventional monochrome signal, is amplified in the unit 12, delayed in time in the unit 13, and applied to the color-image-reproducing apparatus 14. The chrominance signal, specifically the modulated subcarrier wave signal and its side bands, is amplified in the unit 15 and applied to the demodulator and matrix circuit 16. In the unit 16 modulation components of the subcarrier wave signal, for example, the conventional I and Q components may be derived by synchronous detection employing properly phased signals from the output circuits of the oscillator 17. The derived I and Q components are then matrixed to R—Y, B—Y, and G—Y color-difference signals representative, respectively, of the red, blue, and green components of the televised color image. These color-difference signals are applied to the color-image-reproducing apparatus 14 to combine therein with the luminance signal to reproduce the televised image in color.

The signals developed in the oscillator 17 and applied to the demodulator unit 16 are maintained in proper phase relation with respect to the modulated subcarrier wave signal so that the proper color-difference signals will be derived. To effect this result, in a manner to be explained more fully hereinafter, the balanced phase-detection system 18 compares the phase of a signal developed in the oscillator 17 with that of a color burst synchronizing signal applied to the system 18 from an output circuit of the amplifier 15. Any deviation of the phasing of the signals developed in the oscillator 17 from a specific phase relation results in the developing of a control signal in an output circuit of the phase-detection system 18. This control signal is employed by means of the reactance circuit 19 to eliminate such misphasing. A signal developed in the phase-detection system 18 is also utilized in a manner to be described more fully hereinafter to control the gain of the chroma amplifier 15 thereby to effect automatic gain control for the chrominance and burst signals. An output signal of the phase-detection system 18 is also employed in the color-killer circuit 21 to develop a bias potential which renders the chroma amplifier 15 nonconductive except when a burst signal is being received and the color burst and locally generated signals are properly phased. If these signals are properly phased, the chroma amplifier is continuously conductive.

In the synchronizing-signal separator 23 the line- and field-synchronizing signals are separated from the composite video-frequency signal and from each other and are utilized, respectively, in the generators 24 and 25 to develop horizontal and vertical deflection signals. The latter signals are employed in the deflection windings of the apparatus 14 to cause the electron beam of such apparatus to scan a raster on the image screen thereof. A flyback pulse developed in, for example, the horizontal deflection transformer in the generator 24 is applied to input circuits of the phase-detection system 18 and color-killer circuit 21 to cause such units to be operative to develop their different control potentials substantially only during that period when the color burst signal is present.

In addition to the picture signal, a sound signal is also intercepted and an intermediate-frequency sound signal developed in the source 10. Such intermediate-frequency sound signal is then further amplified in the sound-signal reproducer 26 and the audio-frequency components thereof are detected and additionally amplified and utilized to reproduce sound in the unit 26.

*Description of balanced phase-detection system of Fig. 2*

Considering now in detail an embodiment of the balanced phase-detection system 18 of Fig. 1, specifically the embodiment represented in Fig. 2, such phase-detection system comprises means for supplying recurrent color burst signals for synchronizing the reference oscillations. Specifically, such supply means comprises a coupling condenser 32, connected between the chroma amplifier 15 and a primary winding of a bifilar transformer 39, for supplying the reference phase of color burst synchronizing signal which occurs during every line-blanking period. The source of reference oscillations comprises a transformer 30 having the primary winding thereof coupled to the oscillator 17 for supplying a controllable phase or locally generated signal. The secondary winding of the transformer 30 is coupled between the interconnected cathodes of a group of diodes 33, 34, and 35 and a reference potential source, for example chassis-ground, through a pair of series-connected condensers 45 and 46. The condensers 45 and 46 have relatively high impedance for low-frequency signals, for example, for frequencies in the audio-frequency range while having negligible impedance for the color burst or locally generated signals having frequencies of the order of 3.58 megacycles.

The balanced phase-detection system also includes phase-detection apparatus responsive to the burst signals and the oscillations and including three unidirectional conductive devices and circuit means intercoupling the devices for applying the burst signals and oscillations to the circuit means and devices at such magnitudes and phases as to produce at one point in the circuit means a first control voltage for synchronizing the oscillations and at another point a second control voltage which is an indication of the amplitude of the burst signals when the oscillations are in-synchronism but which is substantially zero when the oscillations are out-of-synchronism. More specifically, such apparatus includes three diodes 33, 34, and 35 having interconnected cathodes to provide effectively one common cathode and each having a load resistor coupled between the anode and cathode, specifically, load resistors 36, 38, and 37. Each diode has a unidirectionally conductive current-carrier path between the cathode and anode thereof, specifically, a path for the flow of electrons. The phase-detection apparatus also includes a phase-modifying network coupling the current-carrier paths for causing the color burst and locally generated signals to have different phase relations in each of the diodes 33, 34, and 35. Such network includes the bifilar wound transformer 39 and a phase-shift network comprising a coupling condenser 40 and a circuit 31 broadly resonant at the frequency of the color burst or locally generated signal, specifically, at approximately 3.58 megacycles. The capacitance of the condenser 40 is greater than that of the condenser in the circuit 31 to provide the combination of the condenser 40 and the circuit 31 with the relatively uniform phase-delay characteristics of a delay line and cause the combination to appear substantially as a resistive load to the input circuit. The circuit 31 is coupled through the condenser 40 to the primary winding of the transformer 39. The closely coupled windings of the transformer 39 are elements of a broadly tuned circuit resonant at approximately the frequency of 3.58 megacycles. The circuit including the primary winding of the transformer 39 is coupled to the anode of the diode 33 while the secondary winding is coupled to the anode of the diode 35 in such manner as to have the signals applied to the anodes of the tubes 33 and 35 in antiphase relation. The circuit 31 is connected between the anode of the diode 34 and the reference-potential source, specifically, chassis-ground.

The elements of the tuned circuit including the primary of the transformer 39 are proportioned to apply to the anode of the diode 33 a color burst signal of specific phase with relation to the locally generated signal when the oscillator 17 is properly synchronized. This phase is indicated by the vector D in the vector diagram of Fig. 2*a* where the vector A represents the phase of the locally generated signal applied to the cathodes of the diodes 33, 34, and 35. The secondary winding of the transformer 39 is so connected to the anode of the diode 35 as to develop thereon a color burst signal having the phase represented by the vector C of Fig. 2*a*. The capacitive coupling between the primary winding of the transformer 39 and the circuit 31, together with the tuning of the circuit 31, are such as to develop a color burst signal on the anode of the diode 34 having the phase represented by the vector B of Fig. 2*a*. It is important to keep in mind that the phase relationships represented by the vectors A, B, C, and D of Fig. 2*a* occur only when the oscillator 17 is synchronized.

The above-described network has a plurality of output circuits in which the first and second control voltages are produced. Specifically, one of such output circuits includes a condenser 42 coupled between the terminal of the primary winding of the transformer 39 not connected to the anode of the diode 33 and a reference potential, for example, ground. Such output circuit produces the second control voltage and is coupled, for example, to a color-killer circuit, such as unit 21 in Fig. 1, and through a resistor 20, shown in Fig. 1, to a gain-control circuit of the amplifier 15. Another output circuit produces the first control voltage and includes a condenser 43 coupled between ground and the terminal of the secondary winding of the transformer 39 not connected to the anode of the diode 35. Such other output circuit is effective to develop a conventional automatic-phase-control potential and is coupled for phase-control purposes, for example, to the reactance circuit 19 of Fig. 1. The condensers 42 and 43 have relatively high impedances for signals having frequencies up to half line frequency and negligible impedances for signals having frequencies of the order of 3.58 megacycles.

The balanced phase-detection system 18 of Fig. 2 also includes means for supplying a gating signal coincident with the occurrence of the recurrently occurring color burst signal for application to the phase-detection apparatus to render such apparatus responsive to the color burst and locally generated signals only during the duration of the gating signal. More specifically, such supply means for the gating signal comprises a conductive path including an isolating resistor 41 coupled between a source of flyback signal, for example, between a winding on the horizontal deflection transformer in the line-frequency generated 24 and the junction of the condensers 45 and 46. The flyback signal applied to the interconnected cathodes of the diodes 33, 34, and 35 is negative going to drive such cathodes negative with respect to the anodes of these tubes, thereby rendering the diodes conductive during the duration of the flyback signal.

*Operation of balanced phase-detection system of Fig. 2*

In considering the operation of the phase-detection system 18, it should be remembered that such system is the equivalent of the detector portion of the quadricorrelator system described in the aforementioned January, 1954 I. R. E. article wherein not only a potential for effecting conventional automatic phase control is developed but also an additional signal is developed for controlling the condition of operation of the chrominance channel or of other circuits in the color-television receiver in accordance with the synchronous condition of the color-deriving circuits of such receiver. Normally, such a quadricorrelator circuit would require a pair of balanced phase detectors, each including, for example, two diodes. In accordance with an improved type of balanced phase-detection system, more fully described in applicant's copending application Serial No. 496,171, the pair of desired output potentials are obtained by utilizing a total of only three diodes to provide the functions of a pair of balanced phase detectors. The latter improved system is used herein.

Before considering in detail the operation of the phase-detection system 18, it will be helpful to refer to the vector diagram of Fig. 2*a* wherein the relative phases of signals at different parts of the detector 18 are represented for synchronous or stable operation of the oscillator 17. In such vector diagram, the vector A represents the phase and relative magnitude of the locally generated signal applied through the transformer 30 to the interconnected cathodes of the diodes 33, 34, and 35. The vector D represents the relative phase and magnitude of the color burst signal translated from the chroma amplifier 15 through the condenser 32 and developed across the primary winding of the transformer 39 for application to the anode of the diode 33. The color burst signal developed in the primary winding is inductively coupled to the secondary winding for applying a signal having the phase represented by the vector C of Fig. 2*a* to the anode of the tube 35. The signal on the primary winding of the transformer 39 is also applied through the condenser 40 to the circuit 31 to develop a signal having the phase represented by the vector B for application to the anode of the diode 34. The vectors C—B and D—B represent the magnitudes and phases of the composite signals effectively applied to the diode network as will be explained more fully hereinafter.

With the above as background, the details of operation of the system 18 may now be more easily explained. The negative-going flyback pulses are applied through the resistor 41, the condenser 45, and the secondary winding of the transformer 30 to the cathodes of the diodes 33, 34, and 35 rendering such diodes conductive during the period when the color burst signal is present. The locally generated signal is continuously applied with the same phase to the cathodes of all of the diodes 33, 34, and 35. The color burst signal is applied to the anodes of these tubes with different phases with respect to the locally generated signal, such as represented by the vectors B, C, and D of Fig. 2*a*, when the oscillator 17 is operating in a stable condition, that is, when it is synchronized. The low-frequency load circuit for the signals applied to the diode 34 includes the series circuit of the condensers 45 and 46 while the low-frequency load circuits for the signals applied to the diodes 33 and 35 include not only the series circuit of the condensers 45 and 46 but also, respectively, the condensers 42 and 43. The operation of the diodes 33, 34, and 35 to perform both quadrature-phase and in-phase detection may be explained by considering the operation of these diodes in pairs with the diode 34 common to both pairs.

When the oscillator 17 is synchronized, the color burst signal applied to the anode of the diode 34, represented by the vector B of Fig. 2*a*, combines with the locally generated signal applied to the cathode thereof, represented by the vector A of Fig. 2*a*, to develop across the series circuit of the condensers 45 and 46 a unidirectional potential representative of the phase relation of the applied signals. The signals applied to the diode 35 attempt to develop across the load condenser 43 a potential representative of the phase relation of the vectors C and A of Fig. 2*a*. However, the condensers 45 and 46 are also load condensers for the diode 35 and the potential developed thereacross by the operation of the diode 34 is subtracted from the potential that would otherwise be developed across the condenser 43. Consequently, the latter potential is effectively the same as that which would have been developed if the only signals contributing thereto had the quadrature-phase relationship represented by the vectors A and C—B of Fig. 2*a*, provided the signals represented by the vectors B and C are controlled or adjusted to have equal magnitudes. Since such quadrature-phase relationship is conventionally indicative of synchronous operation of the oscillator, the potential developed across the condenser 42, when the oscillator 17 the circuits including the diodes 34 and 35 is, in all respects, a balanced quadrature-phase control potential. This potential is approximately zero when the oscillator 17 is synchronized and the vector relationship represented by the vectors A, B, and C exists and becomes increasingly large and has a characteristic polarity as the oscillator 17 deviates from synchronous operation in either sense. In other words, the combined effect of the signals applied to the diodes 34 and 35 is the equivalent of having a color burst signal, such as represented by the composite vector C—B of Fig. 2*a* for a synchronized condition, applied to these diodes to provide the conventional quadrature relation of the locally generated and color burst signals. When the oscillator deviates from synchronization, the composite vector C—B rotates with respect to the vector A, as in a conventional phase detector, and phase-control potentials are developed across the condenser 43.

As the diodes 34 and 35 provide a balanced quadrature-phase detector, analogously the diodes 33 and 34 provide a balanced in-phase detector. The signals applied to the diodes 33 and 34 cause average currents to flow therethrough to develop potentials across the condensers 45, 46, and 42. The combined effect of these signals, if the signals represented by the vectors B and D are controlled to have the same magnitude, is the equivalent of having a color burst signal, such as represented by the composite vector D—B of Fig. 2*a* for a synchronized condition, applied to these diodes to develop a balanced in-phase potential. Because of the in-phase relationship of the locally generated signal, represented by the vector A, and the effective signal, represented by the composite vector D—B of Fig. 2*a*, when the oscillator 17 is synchronized, a potential of maximum magnitude is developed across the condenser 42 when such phasing exists, providing the in-phase control signal normally employed to control the operation of a color-killer circuit such as the unit 21 of Fig. 1. As previously discussed, the color-killer circuit conditions the chrominance channel to be conductive or nonconductive during picture periods when a color burst signal is, respectively, present or absent.

The magnitudes or, more accurately, the variations in the magnitude of the potential developed across the condenser 42 also provide information useful in controlling the gain of the chrominance channel to cause the intensities of the signals developed in the output circuits thereof to be maintained within a relatively narrow range for a much wider range of intensities at the input to such a channel. In other words, variations in the potential developed across the condenser 42, when the oscillator 17 is synchronized, provide automatic-chrominance-control (ACC) information for the chrominance channel.

In a conventional balanced phase detector where two signals heterodyne to develop beat signals representative of their phase relation, the stronger of the two signals serves as an energizing potential for the detector while both the phase relation of the weaker signal to the stronger signal and the magnitude of the weaker signal determine the magnitude of any output signal. In other words, such a phase detector is essentially a balanced clamping circuit with the stronger signal providing the clamping potential, which is balanced out in the output circuit, and the weaker signal developing any differential potential. In prior phase-detection systems for the color-deriving circuits of an NTSC type of color-television receiver, the color burst signal is made the stronger signal. The color burst signal in such systems is initially gated to separate it from picture signals and noise and amplified prior to application to the phase detector. Such treatment of the color burst signal not only requires the use of additional gating and amplifying stages in the receiver but also results in the loss of information which could be used to effect automatic chrominance control (ACC).

As transmitted, the level of the color burst signal is constant. If the level of such signal is not constant as it is applied to the phase detectors in the color-deriving circuits of the receiver, then fading or other effects have disturbed the constancy not only of the burst but also of the peak amplitude of the chrominance signal. These effects should be compensated for by controlling the gain of the chrominance channel of the receiver. If the phase detectors were sensitive to variations in the amplitude of the burst signal, the potential developed in the output circuit of the in-phase detector when the oscillator 17 is synchronized would indicate such variation and could be used to effect automatic chrominance control. However, as discussed above, in prior systems the phase detectors are insensitive to variations in the level of the relatively high amplitude color burst signal and such ACC information is lost.

There is another limitation in prior phase-detection systems that results in the burst signal being gated prior to application to the detectors rather than in the detectors. In prior sysems including both in-phase and quadrature-phase detectors, both detectors could not be gated by a single signal in a single operation and, therefore, any gating of the two detectors required rigid control not only of the relative intensity and timing of a pair of gating signals but also of the responses of the detectors. Consequently, separate gating for both the in-phase and quadrature-phase detectors was not considered desirable and was not practiced. However, with a detection system such as represented by the unit 18, having a single cathode for both the in-phase and quadrature-phase detectors, a single gating signal may be applied to such cathode and the burst signal thereby gated within the phase detectors themselves. By employing such gating, not only are the separate gating and amplifier stages present in prior systems eliminated but, in addition, by using the relatively small amplitude burst signal now made possible, the potential developed in the in-phase detector varies in amplitude with burst level variations and provides an ACC potential. This potential applied, for example, to a gain-control circuit of the chroma amplifier 15 of Fig. 1, effects automatic gain control thereof and thereby stabilizes not only the amplitude of the color burst signal but of the chrominance signal translated through such amplifier.

A synchronously detected ACC control potential of the type just described provides many benefits not available in prior ACC systems employing simple peak detection. Since synchronous detection is employed, the developed ACC control potential is relatively free from noise and thus more accurately controls the gain of the chrominance channel. Such gain is controlled substantially only in relation to the amplitude of the burst signal and is little disturbed by noise. In addition, an ACC potential of the type developed in a system such as the detection system 18 of Fig. 2 provides maximum gain of the chrominance channel when the local oscillator is not synchronized and, consequently, provides a color burst signal of maximum amplitude at such time resulting in the obtaining of more rapid synchronization. In addition, such ACC system provides a color burst signal of minimum and constant amplitude substantially free of all noise when the system is synchronized, at which time the maximum ACC potential is being developed.

Though the invention is not limited thereto, the following circuit constants have been found suitable in the detection system 18 of Fig. 2:

| | |
|---|---|
| Diodes **33, 34, 35** | Type 6T8 vacuum tube. |
| Resistors **36, 37, 38** | 1 megohm. |
| Resistor **41** | 1000 ohms. |
| Condenser **40** | 7–45 micromicrofarads. |
| Condensers **42, 43, 45** | 390 micromicrofarads. |
| Condenser **46** | 1000 micromicrofarads. |

In summary, the improved phase-detection system 18 of Fig. 2 is a complete balanced phase-detection system providing both in-phase and quadrature-phase detection though only three diodes are employed instead of the conventional four-diode arrangement. In addition, the detection system 18 of Fig. 2 utilizes a third signal to effect gating of the detectors and further utilizes a color burst signal of relatively low amplitude thereby facilitating the development of an ACC potential for controlling the gain of the chrominance channel. The gating of the detection system dispenses with the need for preliminary gating of the burst signal and the use of a relatively low amplitude burst signal minimizes the number of stages of amplification required for the burst signal.

*Description and operation of phase-detection system of Fig. 3*

The phase-detection system 318 of Fig. 3 is another embodiment which may be utilized for the phase-detection system 18 of Fig. 1. The systems of Figs. 2 and 3 are similar differing only in the phase-modifying networks and the similar elements and components of these systems are identified by the same reference numbers.

In the phase-detection system 318 of Fig. 3, the phase-shift network including the condenser 40 and the circuit 31 is coupled to the anode of the diode 33 and the output circuit including the condenser 42 is coupled between a terminal of the circuit 31 and chassis-ground. Also, in the system 318 of Fig. 3, the circuit including the primary winding of the transformer 39 is coupled to the anode of the diode 34 and through the condenser 43 to ground. The circuit including the secondary winding of the transformer 39 is coupled to the anode of the diode 35 and chassis-ground.

The phases of the color burst signal applied to the anodes of the tubes 33, 34, and 35 are represented, respectively, by the vectors D, B, and C of Fig. 3*a*. The phase of the locally generated signal applied to the cathodes of the diodes 33, 34, and 35 is represented by the vector A of Fig. 3*a*. In a manner similar to that described with reference to the operation of the detection system 18 of Fig. 2, the diodes 34 and 35 in the system 318 of Fig. 3 operate as a pair of balanced phase detectors to develop the APC control potential across the condenser 43. Similarly, the diodes 33 and 35 operate as another pair of balanced phase detectors to develop across the condenser 42 a signal which has an in-phase component. When the oscillator 17 is synchronized, the signals effectively heterodyning in the diodes 33 and 35 have the phase relations represented by the vectors A and D—C. It is apparent that, though the effective component represented by the vector D—C is not in phase with the locally generated signal represented by the vector A when the oscillator is synchronized, the signal represented by vector D—C has a component which is in phase with the locally generated signal. Therefore, a potential is developed across the condenser 42 when the oscillator is synchronized and may be employed in the same manner as the conventional in-phase potential.

Though the balanced phase-detection system described herein have utilized three diodes with interconnected cathodes and separate anodes, it is to be understood that, in accordance with the invention, the anodes may be interconnected and the cathodes separate, and vacuum tubes other than diodes may be employed. Also, though the detection systems have been described with reference to vacuum tubes, other nonlinear elements, such as transistors or crystal diodes, performing functions similar to those of vacuum tubes may be employed in accordance with the teaching of the invention. Additionally, the networks described for effecting the phase adjusting of the signals applied to the diodes may take any of numerous conventional forms in addition to those described herein.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A balanced phase-detection system for the color-signal deriving circuits of an NTSC type of color-television receiver comprising: means for supplying a locally generated signal of controllable phase and a recurrent color burst synchronizing signal of variable intensity lower than that of said locally generated signal for controlling the phase of said locally generated signal; phase-detection apparatus including a plurality of unidirectionally conductive devices effectively having one common electrode responsive to one of said signals and a plurality of other electrodes, a plurality of reactively coupled impedance circuits individually coupled to said other electrodes for applying the other one of said signals thereto with different phases, and a plurality of balanced output circuits coupled to said impedance circuits for developing one balanced output potential representative of the quadrature-phase relationship of said supplied signals and for developing another balanced output potential representative of the in-phase relationship of said supplied signals and which varies in intensity with said intensity variation of said color burst signal; means for supplying a gating signal coincident with said color burst synchronizing signal for application to said common electrode to render said phase-detection apparatus responsive to said supplied signals only during the duration of said gating signal; and means for utilizing said intensity variation of said other balanced output signal to minimize the intensity variation of said color burst synchronizing signal.

2. A balanced phase-detection system for the color-signal deriving circuits of an NTSC type of color-television receiver comprising: means for supplying a locally generated signal of controllable phase and a recurrent color burst synchronizing signal of variable intensity lower than that of said locally generated signal for controlling the phase of said locally generated signal; phase-detection apparatus including three diodes effectively having one cathode responsive to one of said signals and three anodes, a plurality of reactively coupled impedance circuits individually coupled to said anodes for applying the other one of said signals thereto with different phases, and a pair of balanced output circuits coupled to said impedance circuits for developing one balanced output potential representative of the quadrature-phase relationship of said supplied signals and for developing another balanced output potential representative of the in-phase relationship of said supplied signals and which varies in intensity with said variation in the intensity of said color burst signal; a line-frequency deflection circuit for supplying a negative horizontal flyback pulse coincident with said color burst synchronizing signal for application to said cathode to render said phase-detection apparatus responsive to said supplied signals only during the duration of said flyback pulse; and means for utilizing said intensity variation of said other balanced output signal to minimize the intensity variation of said color burst synchronizing signal.

3. A control system for an NTSC type of color-television receiver comprising: a chrominance channel including a source of reference oscillations; means for supplying recurrent color burst signals for synchronizing said oscillations; phase-detection apparatus responsive to said burst signals and said oscillations and including three unidirectional conductive devices and circuit means intercoupling said devices for applying said burst signals and oscillations to said circuit means and devices at such magnitudes and phases as to produce at one point in said circuit means a first control voltage for synchronizing said oscillations and at another point a second control voltage which is an indication of the amplitude of said burst signals when said oscillations are in-synchronism but which is substantially zero when said oscillations are out-of-synchronism; means for utilizing said first control voltage to synchronize said oscillations; and means for utilizing said second control voltage to disable said chrominance channel when said oscillations are out-of-synchronism.

4. A control system for an NTSC type of color-television receiver comprising: a chrominance channel including a source of reference oscillations; means for supplying recurrent color burst signals for synchronizing said oscillations; phase-detection apparatus responsive to said burst signals and said oscillations and including three unidirectional conductive devices and circuit means intercoupling said devices for applying said burst signals and oscillations to said circuit means and devices at such magnitudes and phases as to produce at one point in said circuit means a first control voltage for synchronizing said oscillations and at another point a second control voltage which is an indication of the amplitude of said burst signals when said oscillations are in-synchronism but which is substantially zero when said oscillations are out-of-synchronism; means for utilizing said first control voltage to synchronize said oscillations; and means for utilizing said second control voltage to control the gain of said chrominance channel when said oscillations are in-synchronism.

5. A control system for an NTSC type of color-television receiver comprising: a chrominance channel including a source of reference oscillations; means for supplying recurrent color burst signals for synchronizing said oscillations; phase-detection apparatus responsive to said burst signals and said oscillations and including three unidirectional conductive devices and circuit means intercoupling said devices for applying said burst signals and oscillations to said circuit means and devices at such magnitudes and phases as to produce at one point in said circuit means a first control voltage for synchronizing said oscillations and at another point a second control voltage which is an indication of the amplitude of said burst signals when said oscillations are in-synchronism but which is substantially zero when said oscillations are out-of-synchronism; means for utilizing said first control voltage to synchronize said oscillations; and means for utilizing said second control voltage to control the gain of said chrominance channel when said oscillations are in-synchronism and to disable said chrominance channel when said oscillations are out-of-synchronism.

6. A control system for an NTSC type of color-television receiver comprising: a chrominance channel including a source of reference oscillations; means for supplying recurrent color burst signals for synchronizing said oscillations; phase-detection apparatus responsive to said burst signals and said oscillations and including three unidirectional conductive devices and circuit means intercoupling said devices for applying said burst signals and oscillations to said circuit means and devices at such magnitudes and phases as to produce at one point in said circuit means a first control voltage for synchronizing said oscillations and at another point a second control voltage which is an indication of the amplitude of said burst signals when said oscillations are in-synchronism but which is substantially zero when said oscillations are out-of-synchronism; means for supplying a gating signal coincident with the occurrence of said burst signals for rendering said phase-detection apparatus so responsive only during the duration of said gating signal; means for utilizing said first control voltage to synchronize said oscillations; and means for utilizing said second control voltage to disable said chrominance channel when said oscillations are out-of-synchronism.

7. A control system for an NTSC type of color-television receiver comprising: a chrominance channel including a source of reference oscillations; means for supplying recurrent color burst signals for synchronizing said oscillations; phase-detection apparatus responsive to said burst signals and said oscillations and including three unidirectional conductive devices and circuit means intercoupling said devices for applying said burst signals and oscillations to said circuit means and devices at such magnitudes and phases as to produce at one point in said circuit means a first control voltage for synchronizing said oscillations and at another point a second control voltage which is an indication of the amplitude of said burst signals when said oscillations are in-synchronism but which is substantially zero when said oscillations are out of synchronism; means for supplying a gating signal coincident with the occurrence of said burst signals for rendering said phase-detection apparatus so responsive only during the duration of said gating signal; means for utilizing said first control voltage to synchronize said oscillations; and means for utilizing said second control voltage to control the gain of said chrominance channel when said oscillations are in-synchronism.

8. A control system for an NTSC type of color-television receiver comprising: a chrominance channel including a source of reference oscillations; means for supplying recurrent color burst signals for synchronizing said oscillations; phase-detection apparatus responsive to said burst signals and said oscillations and including three unidirectional conductive devices and circuit means intercoupling said devices for applying said burst signals and oscillations to said circuit means and devices at such magnitudes and phases as to produce at one point in said circuit means a first control voltage for synchronizing said oscillations and at another point a second control voltage which is an indication of the amplitude of said burst signals when said oscillations are in-synchronism but which is substantially zero when said oscillations are out of synchronism; means for supplying a gating signal coincident with the occurrence of said burst signals for rendering said phase-detection apparatus so responsive only during the duration of said gating signal; means for utilizing said first control voltage to synchronize said oscillations; and means for utilizing said second control voltage to control the gain of said chrominance channel when said oscillations are in-synchronism and to disable said chominance channel when said oscillations are out-of-synchronism.

References Cited in the file of this patent

UNITED STATES PATENTS

| | | |
|---|---|---|
| 2,568,250 | O'Brien | Sept. 18, 1951 |
| 2,640,939 | Staschover | June 2, 1953 |
| 2,666,136 | Carpenter | Jan. 12, 1954 |
| 2,703,380 | Fraser | Mar. 1, 1955 |
| 2,718,546 | Schlesinger | Sept. 20, 1955 |